United States Patent
Berstis et al.

(10) Patent No.: US 6,934,707 B1
(45) Date of Patent: *Aug. 23, 2005

(54) NETWORK TRANSMISSION OF PAGES IN LINKABLE MARKUP LANGUAGE TO RECEIVING DISPLAY STATIONS WITH CURRENTLY DISPLAYED PAGES CONTROLLED BY TAGS IN SUCCEEDING PAGES TO PRODUCE AESTHETICALLY PLEASING TRANSITIONS BETWEEN PAGES

(75) Inventors: Viktors Berstis, Austin, TX (US); Janet Dmitrovich, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,612

(22) Filed: Jul. 22, 1999

(51) Int. Cl.[7] ............................................. G06F 17/30
(52) U.S. Cl. ....................... 707/10; 707/501; 707/102; 709/217
(58) Field of Search .............................. 707/530, 500.1, 707/102, 10, 501, 513, 515, 520, 104; 345/863, 473; 709/201, 217, 218, 219

(56) References Cited

U.S. PATENT DOCUMENTS

| | | | |
|---|---|---|---|
| 5,491,778 A | | 2/1996 | Gordon et al. ............... 395/133 |
| 5,706,502 A | | 1/1998 | Foley et al. ................. 395/610 |
| 5,721,908 A | | 2/1998 | Lagarde et al. ............. 395/610 |
| 5,748,188 A | | 5/1998 | Hu et al. ..................... 345/326 |
| 5,781,188 A | * | 7/1998 | Amiot et al. ................ 345/723 |
| 5,880,743 A | * | 3/1999 | Moran et al. ................ 345/473 |
| 5,892,905 A | | 4/1999 | Brandt et al. .......... 395/187.01 |
| 6,177,936 B1 | * | 1/2001 | Cragun ........................ 345/760 |

\* cited by examiner

Primary Examiner—Jean M. Corrielus
(74) Attorney, Agent, or Firm—David A. Mims, Jr.; J. B. Kraft

(57) ABSTRACT

Transitions between current and succeeding World Wide Web (Web) pages are provided which are aesthetically desirable, make the user comfortable and may be easily variable by both designers and users of Web pages in computer managed communication networks such as the Web. There are provided control tags, in a transmitted page selected to succeed a currently displayed page, for controlling display functions in said currently displayed page in combination with means responsive to these control tags for implementing said display functions. In the implementation, control tags in the current page are selectively activatable in response to control tags in the succeeding page. In accordance with a preferred aspect of the invention, the current page further includes data for selectively determining whether the current page is controllable by said succeeding page. This data my be a list of URLs (Uniform Resource Linkages) of succeeding pages only by which the current page may be controlled. Conversely, the succeeding page may be set up to include this data for selectively determining whether said current page is controllable by said succeeding page. Aspects of the effective and desirable transitions described above may be implemented through at least one activatable control tag in said current page controlling a display function for a desirable visual transition from said current page to said succeeding page.

15 Claims, 12 Drawing Sheets

NETWORK TRANSMISSION OF PAGES IN LINKABLE MARKUP LANGUAGE TO RECEIVING DISPLAY STATIONS WITH CURRENTLY DISPLAYED PAGES CONTROLLED BY TAGS IN SUCCEEDING PAGES TO PRODUCE AESTHETICALLY PLEASING TRANSITIONS BETWEEN PAGES

CROSS-REFERENCE TO RELATED COPENDING PATENT APPLICATIONS

The following patent application Ser. No. 09/354,613, having the same inventors and the same assignee as the present invention and filed concurrently herewith, covers subject matter related to the subject matter of the present invention: "Network Transmission of Pages in Linkable Markup Language to Receiving Display Stations with Functions in Currently Displayed Pages Controlled by Tags in Succeeding Pages".

1. Technical Field

The present invention relates to computer managed communication networks such as the World Wide Web (Web) and, particularly, to ease of use of interactive computer controlled display interfaces for receiving a succession of transmitted pages and shifting between such pages in aesthetically pleasing or otherwise interesting transitions over which the users, as well as the creators of the Web pages have some control.

2. Background of Related Art

The 1990's decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, markup languages, and particularly Hypertext Markup Language (HTML), which had been the documentation language of the Internet or Web for years, offered direct links between received pages and other pages on the Web with a variety of related data sources, which were at first text and then evolved into media, i.e. "hypermedia". This even further exploded the use of the Internet or Web.

It has been very remarkable that a facility like the Web, which many originally regarded as almost antiquated, has been able to handle the phenomenal volume of traffic required to meet the demand. During the past few years, most of the technological resource associated with the Web has been exhaustively applied in meeting the greatly increasing traffic demands. As a result, relatively little effort has been applied in enhancing Web user interfaces in order to make them more user friendly, as well as more aesthetically pleasing, interesting and variable.

Finally, at the present point in the development of the Web, there are computer hardware and software resources available beyond just what it takes to meet traffic flow demands, and, consequently, techniques for enhancing human/Web interfaces aesthetically and by making the user more comfortable, may be addressed. The present invention is directed to such an end. It should be clear to anyone who has browsed the Web that the visual transitions between current and succeeding pages are at best abrupt and, at worst, quite disconcerting as the user has to stand by while the current page drops out and the succeeding page fragments itself together.

The above-referenced copending patent application Ser. No. 09/359,613 provides progressions or shifting between current and succeeding Web pages which make the user comfortable, and may be easily variable by both designers and users of Web pages. The invention is directed to computer managed communication networks such as the Web or Internet. (In the present application, these terms are used synonymously.) Conventionally, user access to the network is through a plurality of data processor controlled interactive receiving display stations. The displayed received pages have been transmitted in a linkable markup language to the receiving display stations from locations remote from said stations. The received pages contain text, images and markup language control tags. The referenced invention involves the use of such control tags in a transmitted page selected to succeed a currently displayed page for controlling display functions in said currently displayed page in combination with means responsive to these control tags for implementing said display functions. In the implementation, control tags in the current page are selectively activatable in response to control tags in the succeeding page.

SUMMARY OF THE PRESENT INVENTION

The present invention provides an application of the broader elements of the referenced patent application to provide varied and aesthetically pleasing transitions between current and succeeding Web pages. Thus, in its broadest aspects, the present invention involves the combination of control tags in a transmitted page selected to succeed a currently displayed page for controlling display functions in said currently displayed page to vary visual transitions from said current page to the succeeding page, and means responsive to said control tags for implementing said display functions comprising control tags in the currently displayed page, selectively activatable by said control tags in said succeeding page. In accordance with one aspect of the invention, the current page further includes data for selectively determining whether the current page is controllable by said succeeding page. This data may be a list of URLs (Uniform Resource Linkages) of succeeding pages only by which the current page may be controlled. Conversely, the succeeding page may be set up to include this data for selectively determining whether said current page is controllable by said succeeding page.

Some of the visual transitions which the present invention may be used to implement are: slide out, either to the left, right, top, bottom or radially; fade to white, fade to black; fade to new image; or shrink to zero size, among others.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Before going into the details of specific embodiments, it will be helpful to understand from a more general perspective the various elements and methods which may be related to the present invention. Since a major aspect of the present invention is directed to documents such as Web pages transmitted over networks, an understanding of networks and their operating principles would be helpful. We will not go into great detail in describing the networks to which the present invention is applicable. Reference has also been made to the applicability of the present invention to a global network, such as the Internet. For details on Internet nodes, objects and links, reference is made to the text, *Mastering the Internet*, G. H. Cady et al., published by Sybex Inc., Alameda, Calif., 1996.

Any data communication system which interconnects or links computer controlled systems with various sites defines a communications network. A network may be as simple as two linked computers or it may be any combination of Local Area Networks (LANs) or Wide Area Networks (WANs). Of course, the Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. The HTML language is described in detail in: "*Just Java*", 2nd Edition, Peter van der Linden, Sun Microsystems, 1997; and in the text *Dynamic HTML in Action*, Michele Petrovsky, Osbourne, McGraw-Hill, Berkeley, Calif., 1998, which deals extensively with the use of HTML tags at pp. 87–103; and also in the text, *Mastering the Internet*, Cady et al., published by Sybex, Alameda, Calif., 1996, particularly at pp. 637–642 on HTML in the formation of Web pages. In addition, some aspects of this invention will involve Web browsers. A general and comprehensive description of browsers may be found in the aforementioned Cady et al. text, pp. 291–313.

Figure 1:
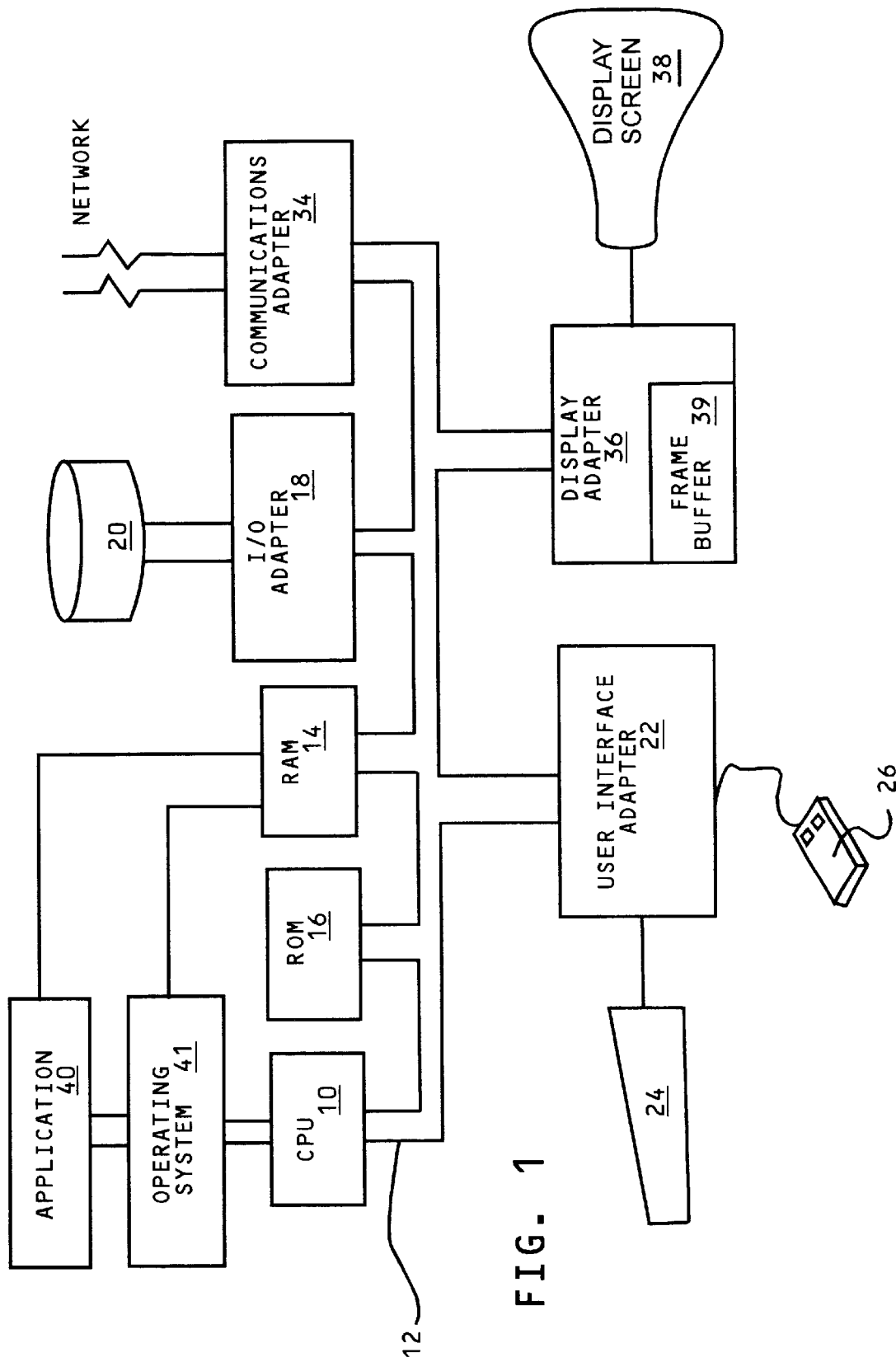
FIG. 1 is a block diagram of a data processing system including a central processing unit and network connections via a communications adapter which is capable of implementing a user interactive display station on which the received data may be converted into a displayed Web page, and succeeding pages transitioned into display in accordance with the present invention.

Referring to FIG. 1, a typical data processing terminal is shown which may function as a basic computer controlled network receiving terminal used in implementing the present invention for controlling page transition functions in currently displayed pages by tags in succeeding pages. A central processing unit (CPU) 10, such as one of the PC microprocessors or workstations, e.g. RISC System/6000™ (RISC System/6000 is a trademark of International Business Machines Corporation) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system or OS/2™ operating system available from IBM (AIX 6000 and OS/2 are trademarks of International Business Machines Corporation); Microsoft's Windows 98™ or Windows NT™, as well as UNIX and AIX operating systems. Application programs 40 controlled by the system are moved into and out of the main memory, RAM 14. These programs include the program of the present invention for controlling a variety of transitional functions in current pages by tags in succeeding pages. Such programs may be used in combination with or as part of any conventional Web browser program, such as Netscape Navigator 3.0™ or Microsoft's Internet Explorer™. A read only memory (ROM) 16 is connected to CPU 10 via bus 12 and includes the basic input/output system (BIOS) that controls the basic computer functions. RAM (random access memory) 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a LAN or WAN, which includes, of course, the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the browser and the related programs according to the present invention. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 2:
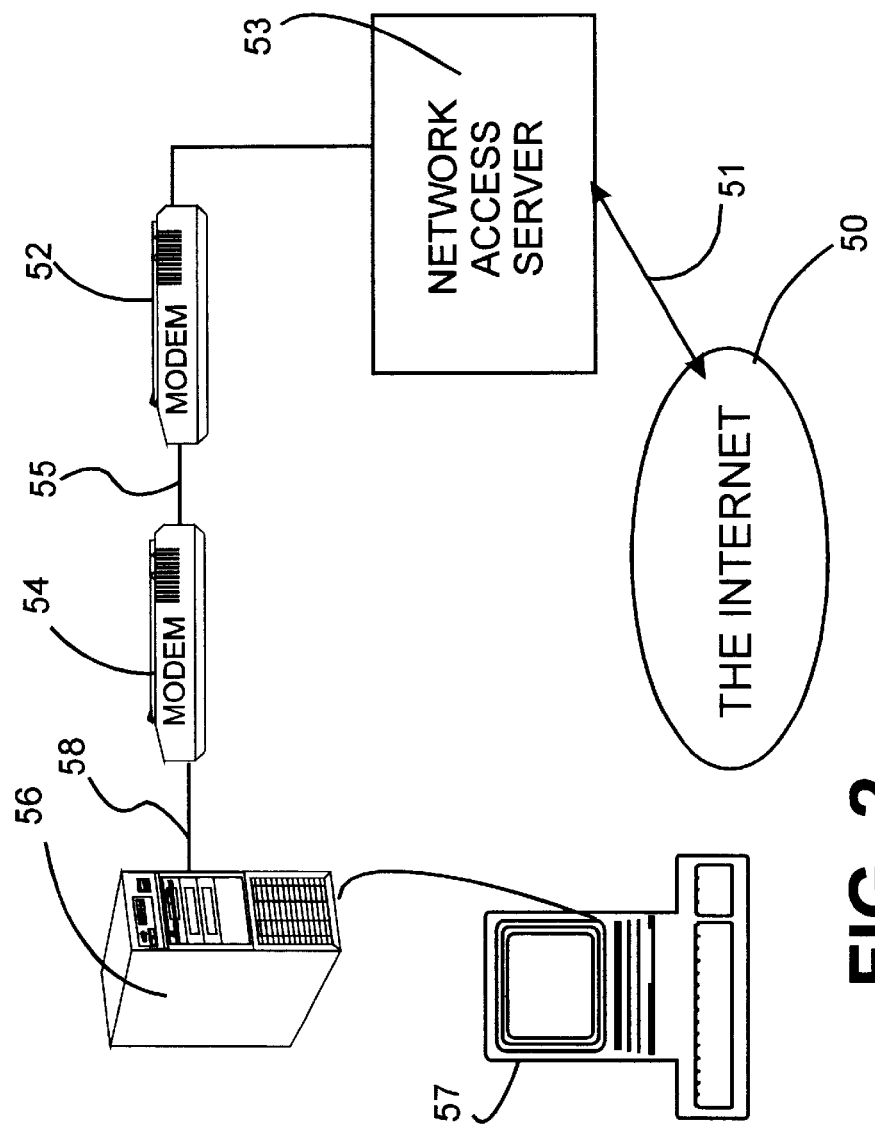
FIG. 2 is a generalized diagrammatic view of an Internet or Web portion upon which the present invention may be implemented.

A generalized diagram of a portion of the Internet or Web, which the computer 56 controlled display terminal 57 may use for Web page or document or linked Web page or document access and display according to the present invention, is connected as shown in FIG. 2. Computer 56 and display terminal 57 are the computer system shown in FIG. 1 and connection 58 (FIG. 2) is the network connection shown in FIG. 1. Reference may be made to the above-mentioned *Mastering the Internet,* pp. 136–147, for typical connections between local display workstations to the Internet via network servers, any of which may be used to implement the system on which this invention is used. The system embodiment of FIG. 2 is one of these known as a "host-dial connection". Such host-dial connections have been in use for over 30 years through network access servers 53 which are linked 51 to the Internet 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53 which may have accessed them from the Internet 50 via linkage 51.

The present invention is preferably implemented on the Web browser in combination with standard browser functions. Standard browser processes are used to access and receive Web documents comprising one or more pages from the Web in a conventional manner. It is to such received documents at receiving display station that the present invention applies.

With respect to FIGS. 3 through 10, there will be described some illustrative transitions between current and succeeding Web pages in accordance with the present invention. Before describing such transitions, we will show outlines of HTML pages respectively defining the current and succeeding Web pages in accordance with this invention.

---

HTML FORMAT of CURRENT PAGE

<HTML>
<HEAD>
<BODY>
<Allow_Succeeding_Page_Control
URL=http://www.ibm.com/*>
    - - - - - - - - - -
    - - - - - - - - - -
<IMG SRC=xxx.gif   Label=Img1>
    - - - - - - - - - -
</BODY>
</HEAD>
</HTML>

HTML FORMAT OF SUCCEEDING PAGE

<HTML>
<HEAD>
<BODY>
<PIMG   Label=Img 1 URL = http://.www.Crazyed.com
Action=slide_to_right   Time=2.5 sec>
    - - - - - - - - - -
    - - - - - - - - - -
</BODY>
</HEAD>
</HTML>

---

It should be noted that from the HTML format of the current page that there is first a tag, <Allow . . . >, which permits the user or designer to specify by URL which succeeding pages may be permitted to control the current page. It should be noted from the format of the succeeding page from the tag <PIMG Label=Img1 and URL=. . . > that the succeeding page may also specify by URLs in which current pages it will activate tags. However, primarily, the tag specifies which tag in the current page will be activated, "PIMG Label=Img1" means in the previous image or page label Img1 will be activated. From the format of the current page, it is noted that Img1 labels the tag <IMG SRC=xxx. gif . . . > which indicates that the transition image to be used is the gifformat file named xxx.gif. Finally, the tag in the succeeding page indicates the action to be taken, slide out to the right over 2.5 seconds.

Figure 3:
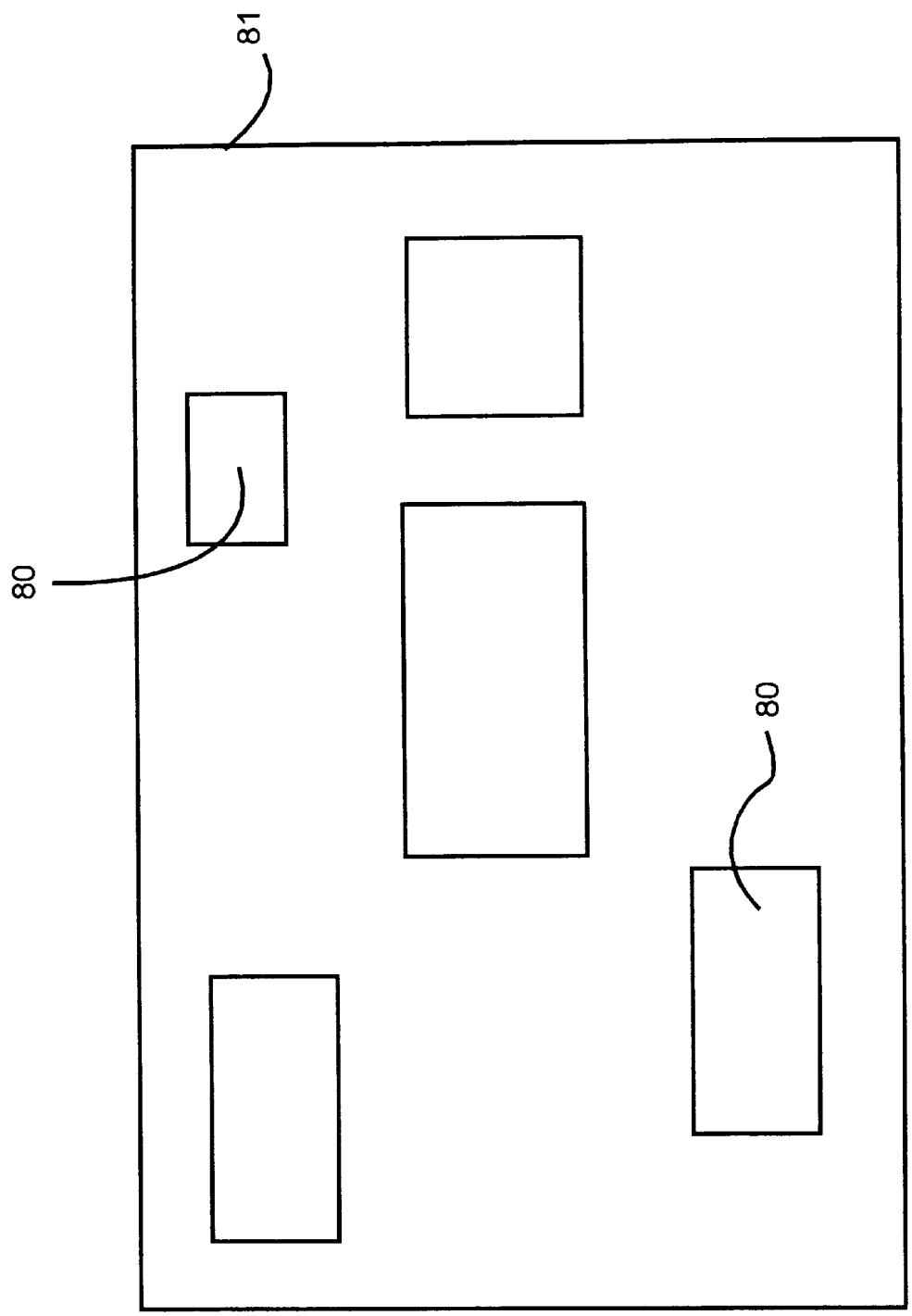
FIG. 3 is a diagrammatic view of a current Web page in a display prior to a transition to the next or succeeding page.
Figure 4:
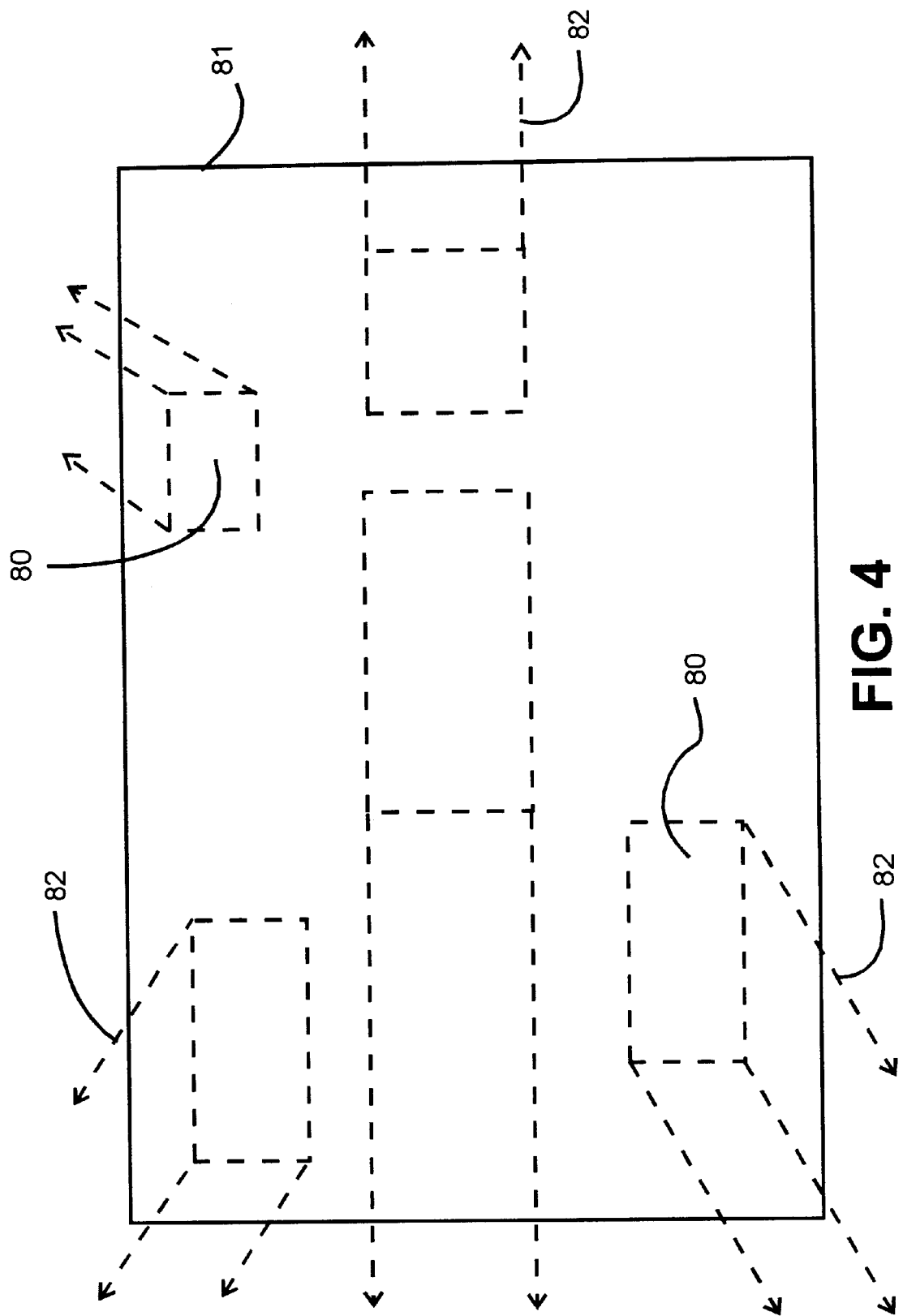
FIG. 4 is the current page of FIG. 3 being transitioned with a radial slide out.
Figure 5:
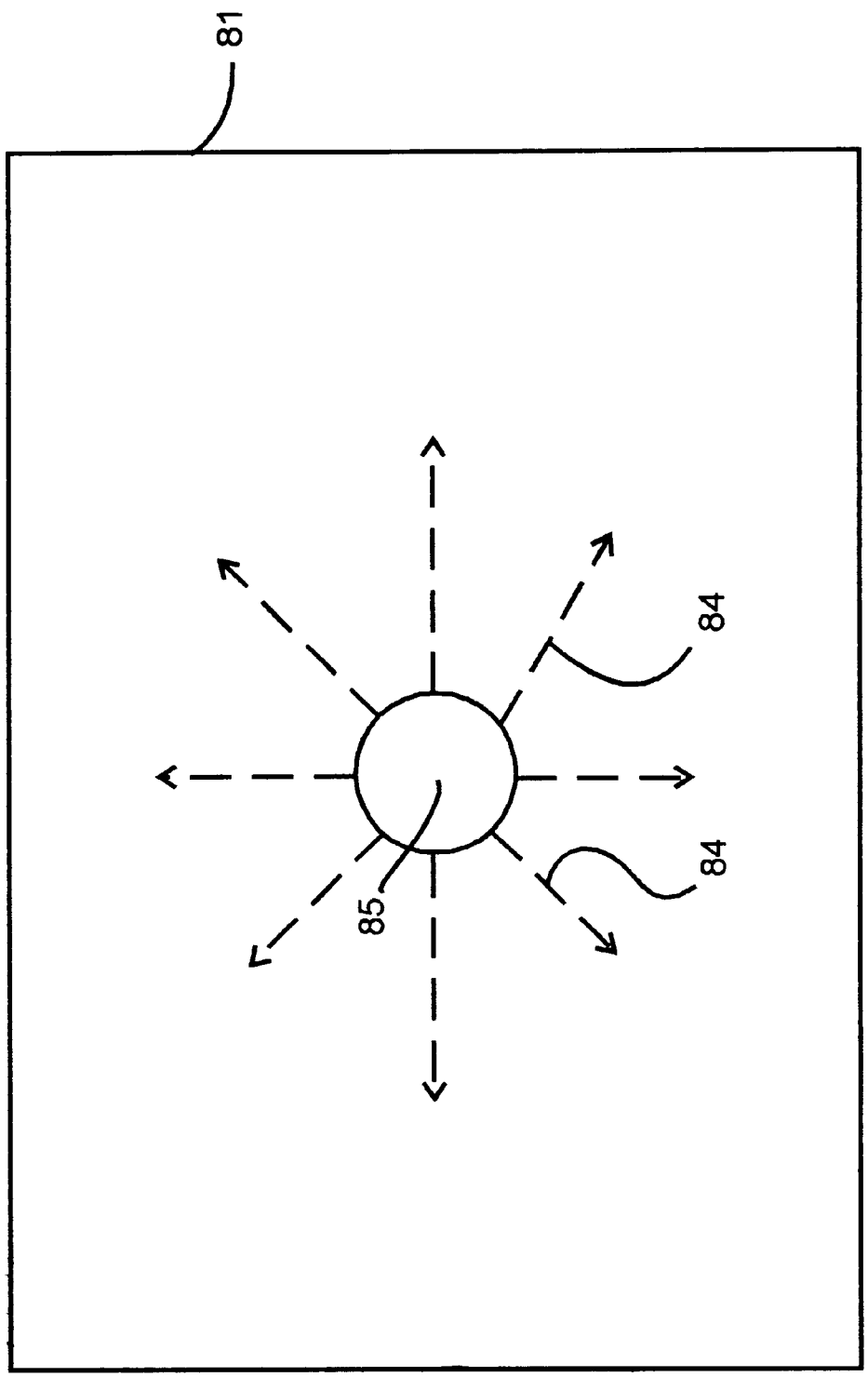
FIG. 5 is a diagrammatic view showing an expansion of the succeeding page to the current page faded-out in FIG. 4; the expansion is radial from a central point in the display.
Figure 6:
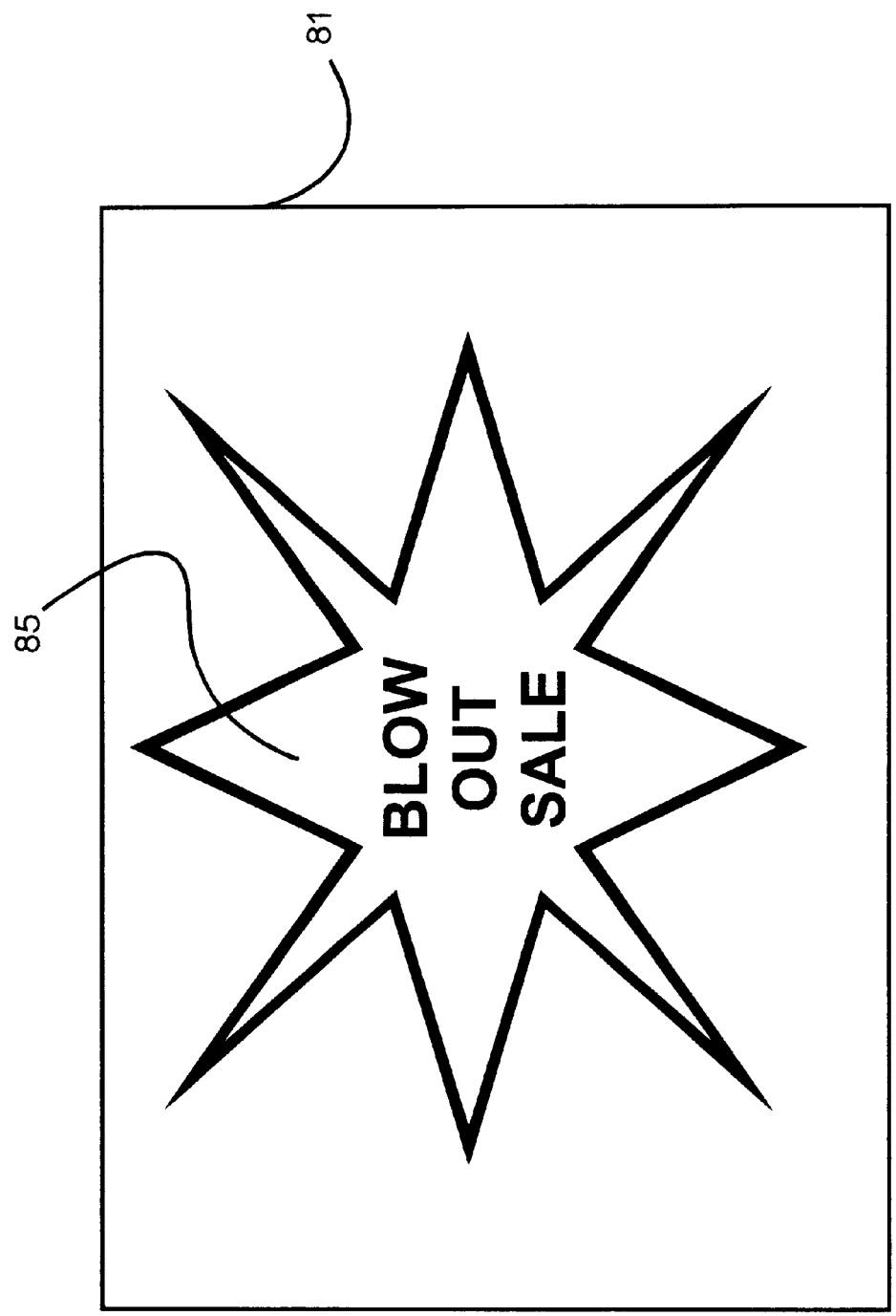
FIG. 6 is the diagrammatic view of FIG. 5 upon the completion of the full radial expansion of the succeeding page.

Now with respect to FIGS. 3 through 10, the illustrative transitions between current and succeeding pages will be described. FIG. 3 is a simplified image of a current page 81. It has several page elements 80 which may be text or images. In FIG. 4, tags in the succeeding page have initiated a radial slide out, and, thus, elements 80 are sliding out of the display page in the direction 82 shown. When the radial slide out is completed, then FIG. 5, the succeeding page image begins to expand out radially from a minute center image 83 along radial lines 84 until the succeeding page image has fully replaced the current page as shown in FIG. 6.

Figure 7:
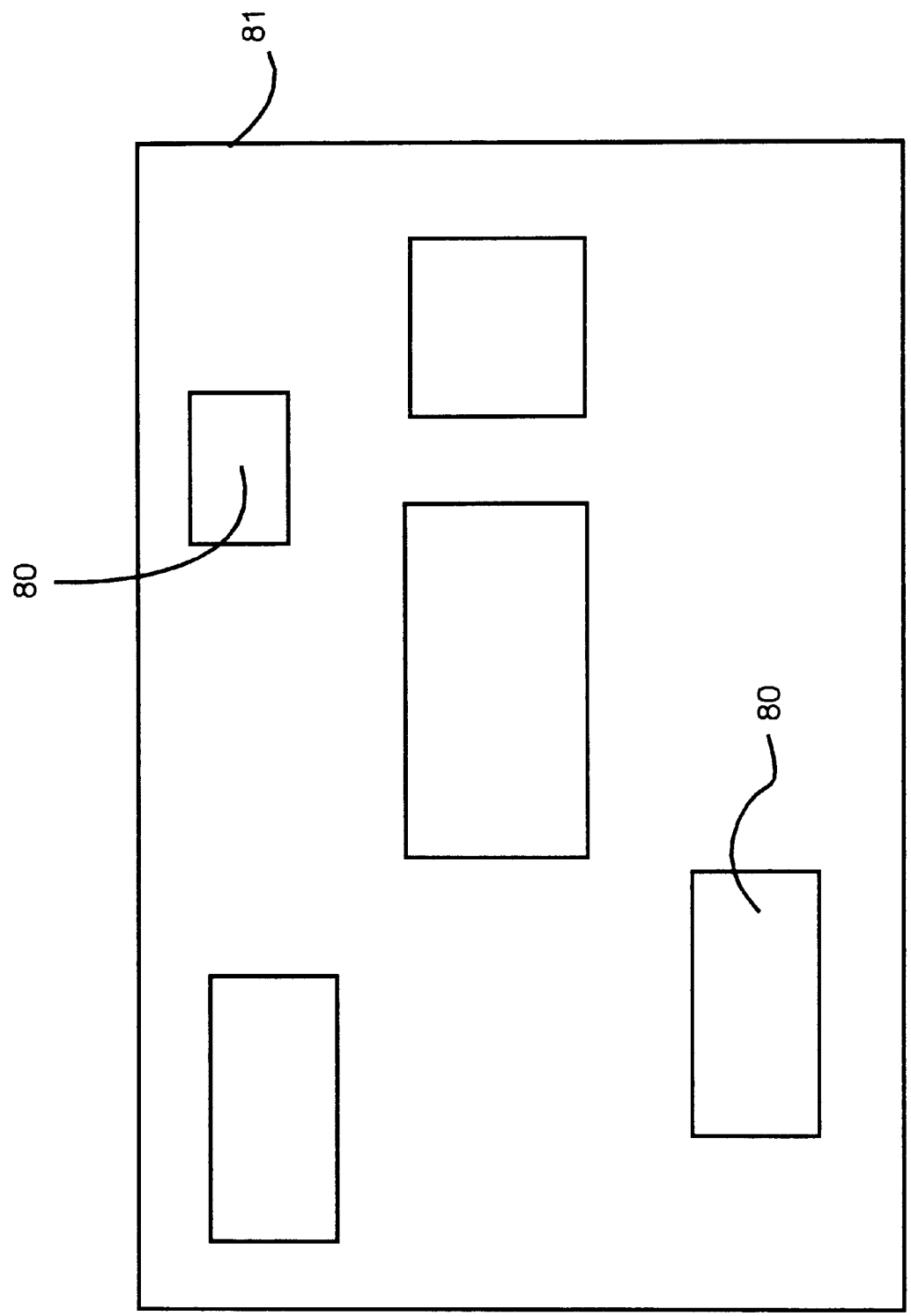
FIG. 7 is again the current page of FIG. 3.
Figure 8:
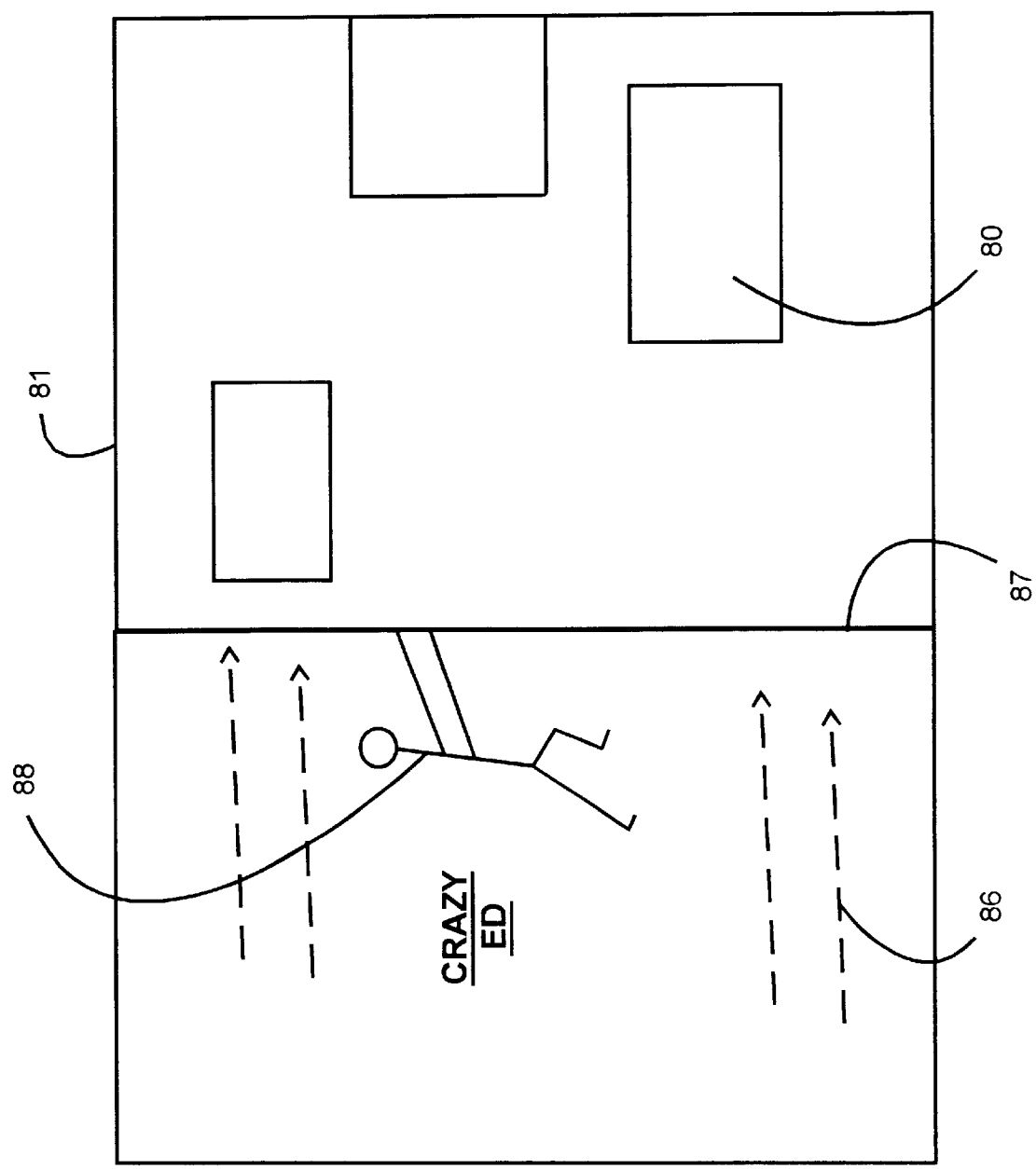
FIG. 8 is the current page slide-out to the right by a transitional image.
Figure 9:
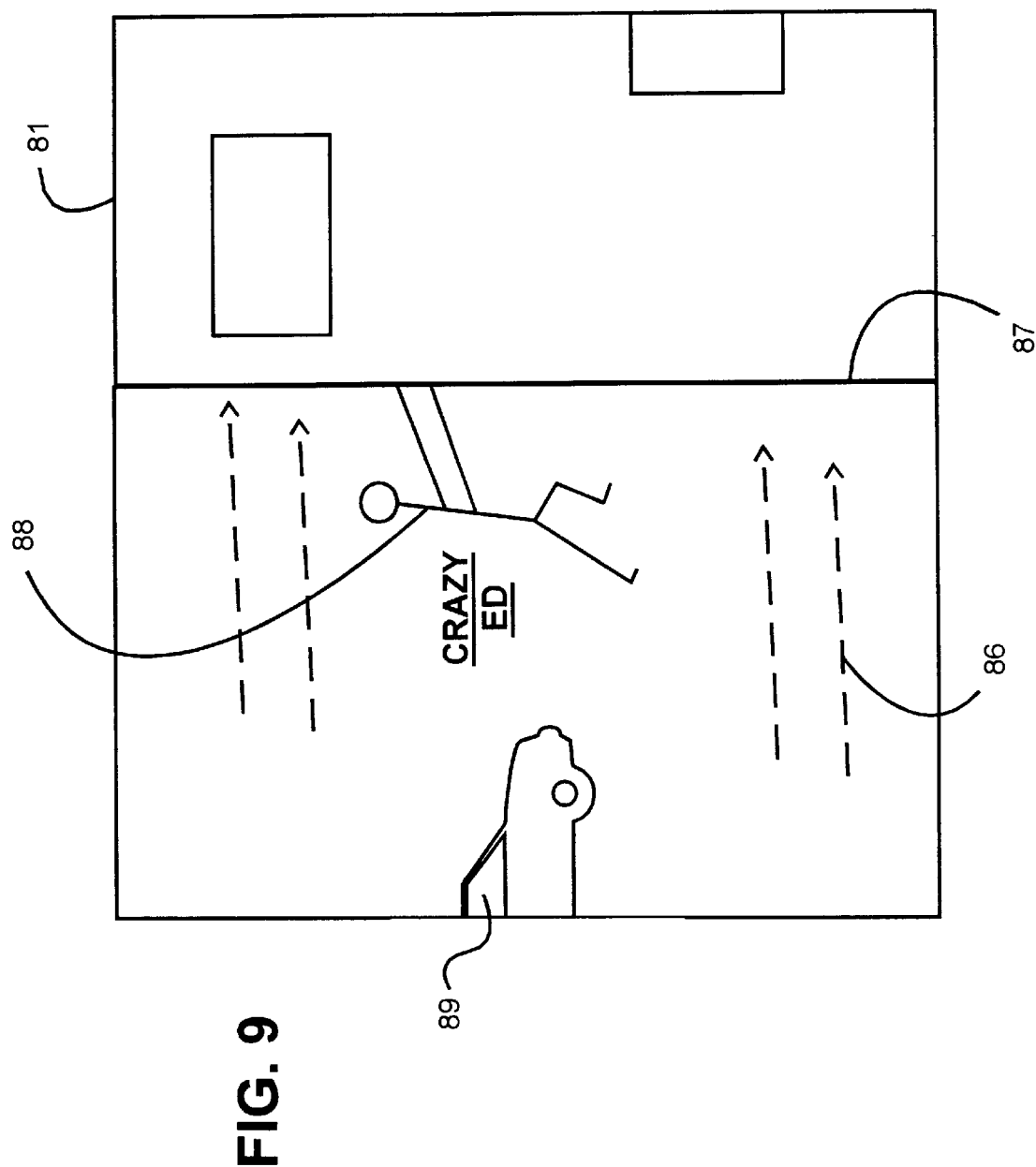
FIG. 9 is the current page of FIG. 8 at a further stage of slide-out to the right.
Figure 10:
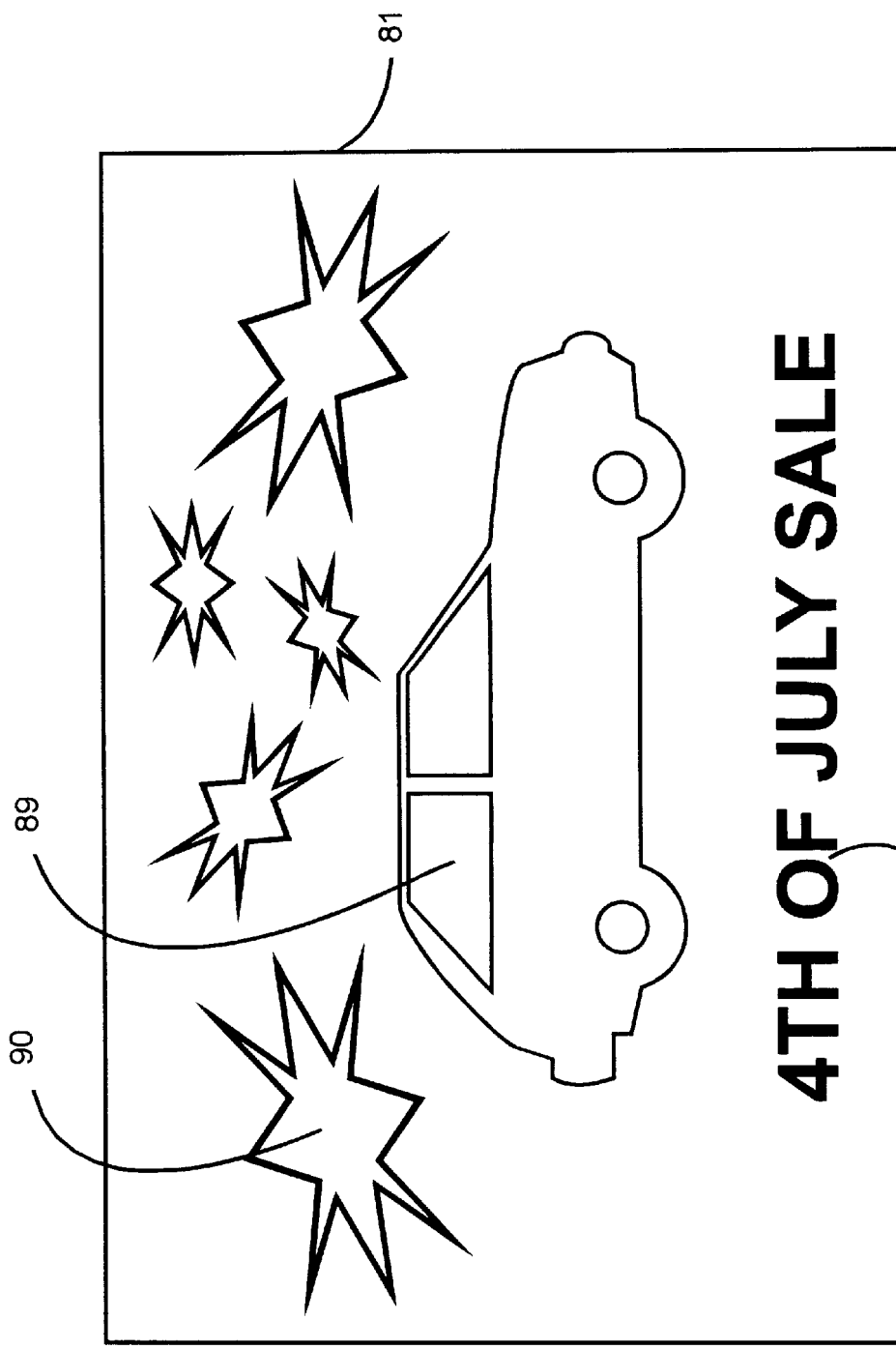
FIG. 10 is the diagrammatic view of FIG. 9 upon the completion of the full slide right fade-in of the succeeding page.

Now commencing with FIG. 7, another transition example will be shown which is the transition specified in the HTML pages described above. The displayed current page image 81 has several page elements 80 which may be text or images. The first stage of the transition is shown in FIG. 8 where an image 88 of a man, "Crazy Ed", perhaps an automobile dealer, is shown-pushing or sliding the current page 81 at its edge 87 to the right along lines 86. The progress of the pushing is shown in FIG. 9 where the succeeding page image, in the form of automobile 89, begins to enter to the right until finally the succeeding image has completely replaced the previously current image in display 81. It includes the automobile 89, fireworks bursts 90 and the announcement 91 of a "4th of July Sale".

Figure 11:
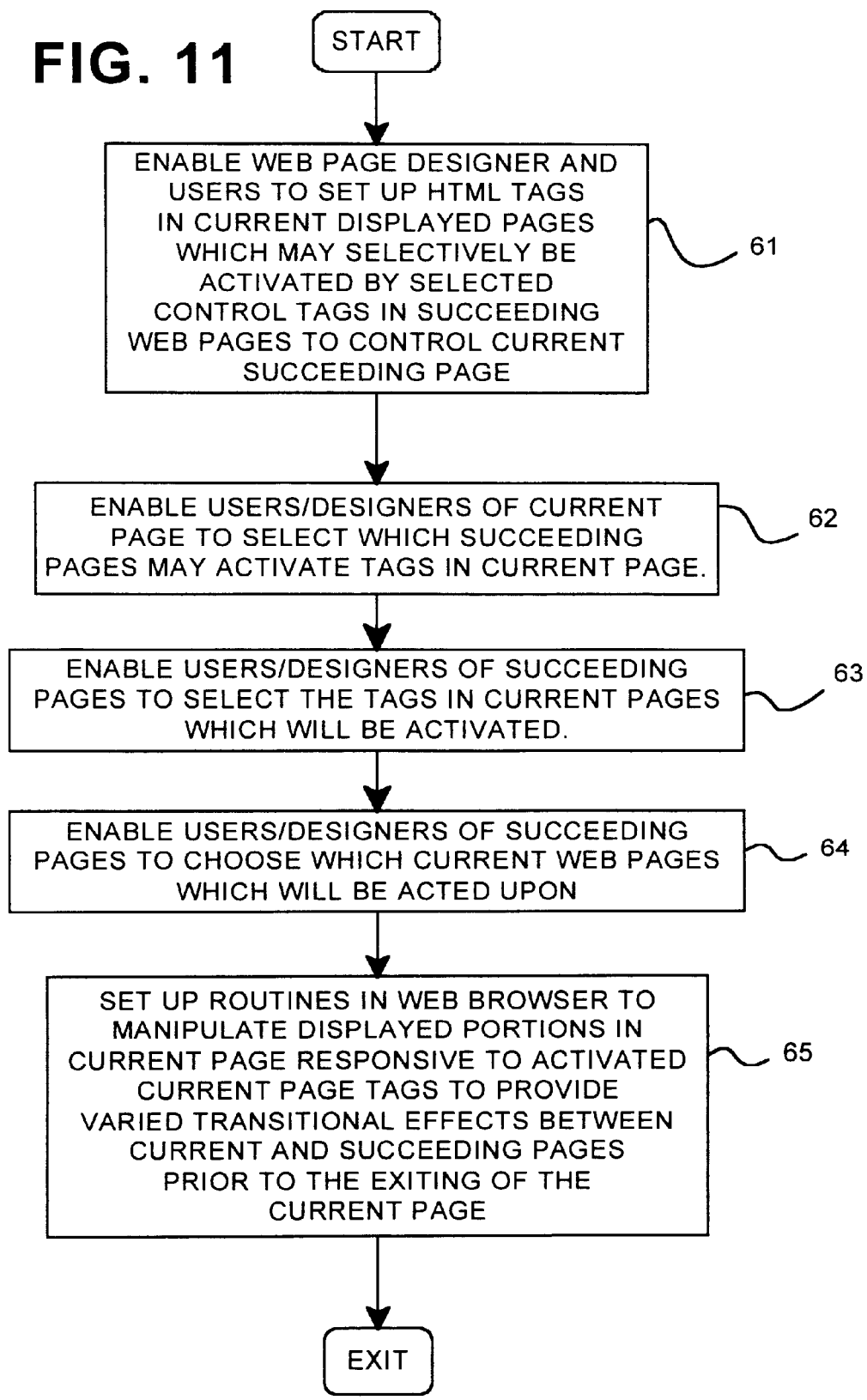
FIG. 11 is a general flowchart of a program set up to implement the present invention for enabling users and designers of Web pages to provide for visual transitions between current and succeeding Web pages.
Figure 12:
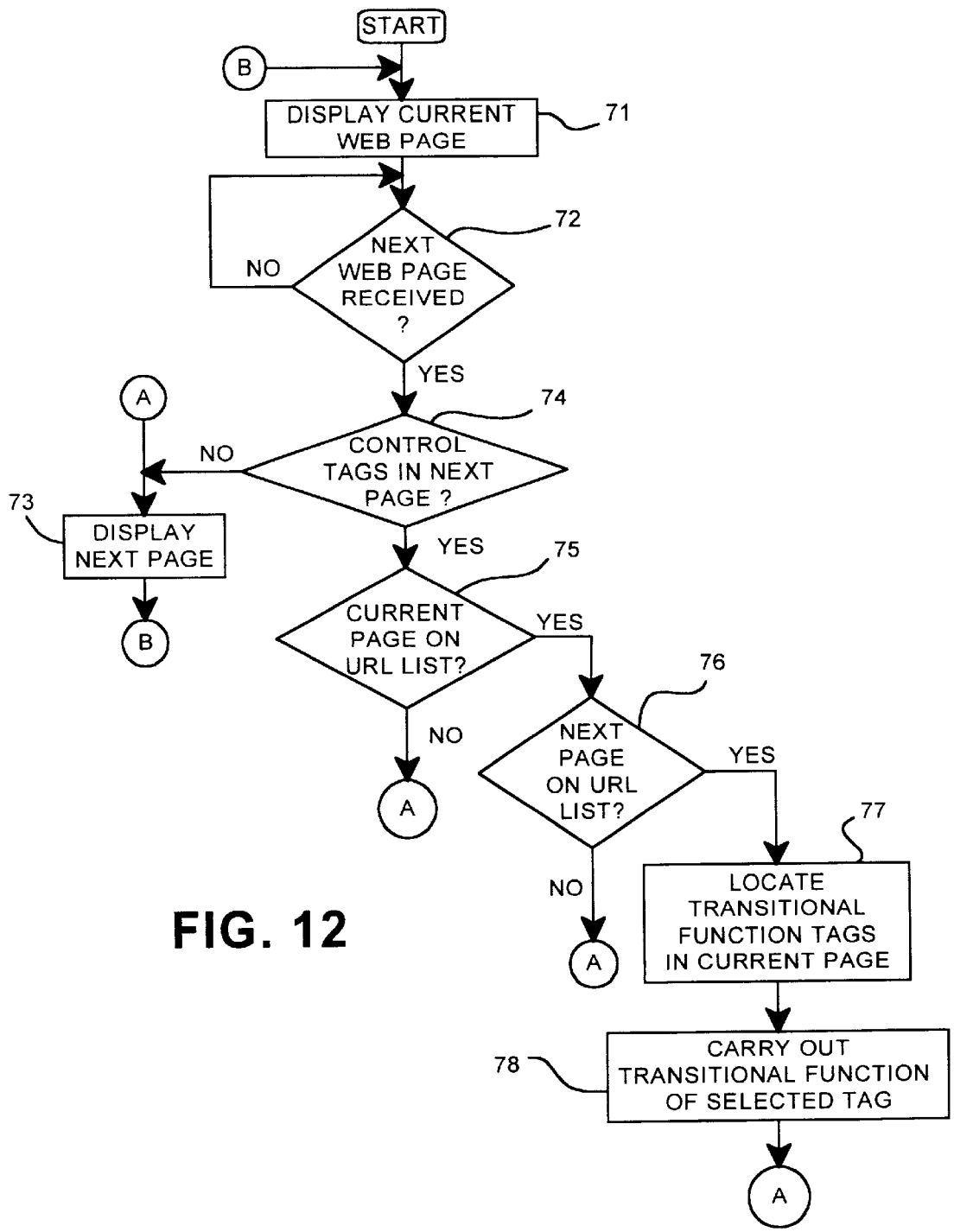
FIG. 12 is a flowchart of an illustrative run of a program set up in accordance with the flowchart of FIG. 11.

Now with reference to FIGS. 11 and 12, we will describe a process implemented by the present invention in conjunction with the flowcharts of these figures. FIG. 11 is a flowchart showing the development of a process according to the present invention for providing HTML tags in a succeeding Web page for controlling functions in the currently displayed Web page which is being replaced by this succeeding page in a transition which the present invention proposes to control. In its broadest aspects, the application program of the present invention is set up to enable designers and or users of Web pages to set up HTML tags in currently displayed Web pages which may be selectively activated by selective control tags in the succeeding Web page to control the current Web page so as to vary transitions to the succeeding page, step 61, FIG. 11. For purposes of the present illustration, we will consider such transitions primarily with respect to aesthetically desirable effects between pages. Also, step 62, the program is set up so as to permit the designers and/or users of the current page to have the ability to determine which succeeding Web pages will be enabled to activate tags in the current page. In other words, the prior or current Web page will be able to table or list Web pages identified by their URLs which will be given access to control the tags in the current page. Likewise, the users and/or designers of the succeeding Web pages may also be given the option, step 64, to choose which current or, thus, previous Web pages will have their tags activated by the control tags in the succeeding Web page. This may also be implemented through a listing in the succeeding page of qualified current Web pages also identified through their URLs. Assuming that both the current and succeeding Web pages are mutually qualified to thus interact, then, step 63, the users of the succeeding Web page should be able to select which of the tags in the currently displayed page will be activated to effect the transition. In carrying this function out, the control tags for this purpose in the succeeding Web page should be set up at the front of the HTML format of the succeeding page. These tags should reference the tags in the current page which will be activated. In turn, the appropriate attributes will be applied, which will coact with the browser application creating the page format to render the appropriate transitional effects between pages, step 65.

The running of the process will now be described with respect to FIG. 12. First, step 71, a current Web page is displayed. This page has been accessed conventionally by an appropriate browser program. Next, a determination is made, step 72, as to whether the next or succeeding Web page has been accessed. If No, the process of the present invention awaits the arrival of the next page while the user addresses the Web page in accordance with his interests. When the decision from step 72 is Yes, the next page has been accessed, the next page does not immediately replace the current page. First, a determination is made, step 74, as to whether there are control tags in this next page for controlling function in the previous or current page. As stated hereinabove, such control tags are usually located near the front of the received HTML format representative of the next page. If there are no such tags, i.e. No from step 74, then, step 73, the next page is routinely displayed without any transitional manipulations. If the decision is Yes, there are such control tags, then a determination is made, step 75, as to whether the current page qualifies to have its tags activated by the control tags in the next page. In other words, does the current page have its URL listed in next page as a page which the next page may manipulate through a selected transition between pages? If No, then via branch "A", the process goes back to step 73, and the next page is again conventionally displayed without any special transition. However, if the decision from step 75 is Yes, the current page qualifies, then a further determination is made, step 76, as to whether the next page qualifies to have its tags activate the control tags in the current page. In other words, does the next page have its URL listed in current page as a page which the current page may be manipulated through a selected transition between pages? If No, then via branch "A", the process goes back to step 73, and the next page is again conventionally displayed without any special transition. However, if the decision from step 76 is Yes, the next page qualifies, then step 77, all of tags in the current page which will manipulate the transition are located and one or more are selectively activated to perform their transitional functions, step 78, after which through branch "A", the process will return to step 73 and after appropriate transitions, the new page will be displayed. At this point, as indicated by branch "B" in the process, this next page becomes, in effect, the current page, step 71, the succeeding or next Web page is again awaited, step 72.

One of the preferred implementations of the present invention is as an application program 40 made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer managed communication network with user access via a plurality of data processor controlled interactive receiving display stations and with a system for displaying received pages transmitted in a linkable markup language to said receiving display stations from locations remote from said stations, said received pages containing text, images and markup language control tags, the improvement comprising:

control tags in a transmitted page selected to succeed a currently displayed page for controlling display functions in said currently displayed page to vary visual transitions from said current page to said succeeding page; and control tags in the currently displayed page, selectively activatable by said control tags in said succeeding page for implementing said display functions.

2. The communication network of claim 1 wherein said markup language is Hypertext Markup Language and said communication network is the World Wide Web.

3. The communication network of claim 2 wherein said display functions vary visual transitions including a slide out of the display in a selected direction by the current page and a slide into said display in said direction by the succeeding page.

4. The communication network of claim 2 wherein said display functions vary visual transitions including a fade to white by the current page.

5. The communication network or claim 2 wherein said display functions vary visual transitions including a fade to black by the current page.

6. In a computer managed communication network with user access via a plurality of data processor controlled interactive receiving display stations and with a system for displaying received pages transmitted in a linkable markup language to said receiving display stations from locations remote from said stations, said received pages containing text, images and markup language control tags, a method of controlling display functions comprising:

providing control tags in a transmitted page selected to succeed a currently displayed page for controlling display functions in said currently displayed page to vary visual transition from said current page to said succeeding page; and providing control tags in the currently displayed page, selectively activatable by said control tags in said succeeding page for implementing said display functions.

7. The method of claim 6 wherein said markup language is Hypertext Markup Language and said communication network is the World Wide Web.

8. The method of claim 7 wherein said display functions vary visual transitions including a slide out of the display in a selected direction by the current page and a slide into said display in said direction by the succeeding page.

9. The method of claim 7 wherein said display functions vary visual transitions including a fade to white by the current page.

10. The method of claim 7 wherein said display functions vary visual transitions including a fade to black by the current page.

11. A computer program having code recorded on a computer readable medium for controlling display functions in a computer managed communication network with user access via a plurality of data processor controlled interactive receiving display stations and with a system for displaying received pages transmitted in a linkable markup language to said receiving display stations from locations remote from said stations, said received pages containing text, images and markup language control tags, said computer program comprising:
- control tags in a transmitted page selected to succeed a currently displayed page for controlling display functions in said currently displayed page to vary visual transition from said current page to said succeeding page; and
- control tags in the currently displayed page, selectively activatable by said control tags in said succeeding page for implementing said display functions.

12. The computer program of claim 11 wherein said markup language is Hypertext Markup Language and said communication network is the World Wide Web.

13. The computer program of claim 12 wherein said display functions vary visual transitions including a slide out of the display in a selected direction by the current page and a slide into said display in said direction by the succeeding page.

14. The computer program of claim 12 wherein said display functions vary visual transitions including a fade to white by the current page.

15. The computer program of claim 12 wherein said display functions vary visual transitions including a fade to black by the current page.

* * * * *